Oct. 28, 1952 R. S. BAILEY 2,616,049
AUTOMATIC FREQUENCY CONTROL
Filed July 9, 1949
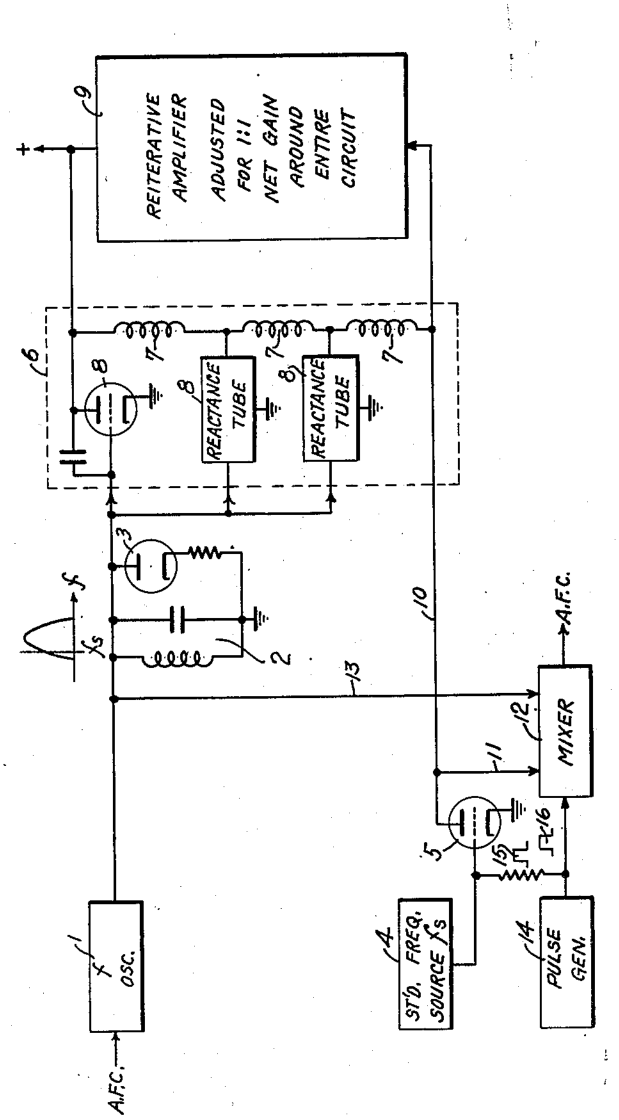
INVENTOR
ROBERT S. BAILEY
BY R.R. Morris
ATTORNEY Patented Oct. 28, 1952

2,616,049

UNITED STATES PATENT OFFICE 2,616,049

AUTOMATIC FREQUENCY CONTROL

Robert S. Bailey, Bayside, N. Y., assignor to International Standard Electric Corporation, New York, N. Y., a corporation of Delaware Application July 9, 1949, Serial No. 103,925

7 Claims. (Cl. 250—36)

This invention relates to a system of automatic frequency control, particularly one having as one characteristic an extreme accuracy.

In most frequency control arrangements as generally known, where a comparison is made between a standard frequency and deviating values departing from a center frequency, the comparison is based on a small deviation increment, so that inherently the result is apt to contain a varying amount of error. It follows therefore that if at least one of these compared values in some way could be given a relatively large range, more satisfactory results would be expected.

It is an object of this invention to provide an automatic frequency control arrangement of great accuracy in its control operation.

It is another object to provide an automatic frequency control arrangement wherein the determination of a value of the deviation from standard, or center, is based on a multiplied effect so as to derive a more accurate control voltage.

A further object is to provide in a device of the aforesaid type a comparison arrangement which utilizes as one of the compared energizes, a greatly increased phase shift in a given wave, which shift is derived partly from the deviation values of the oscillator being controlled and partly from the operation by which the increased phase shift of the given wave is effected.

A still further object is to provide a comparison arrangement in a device of the type mentioned in which one of the values compared is a given wave whose phase has been given a greatly increased shift, said shift being derived partly from the deviation values of the oscillator being controlled and partly from the operation by which the increased phase shift of the given wave is effected, and the other value is a wave from which the shift was derived.

According to the invention, the energy derived from a deviation discriminator is used to control the phase shift in a delay transmission line having therein reactance devices subject to said control, said delay line being coupled to transmit a wave of the standard, or stable, frequency source for multiplying the phase shift of said standard frequency in said line, and means for comparing the phase multiplied standard wave with the frequency of a wave from which it was derived.

The foregoing and other objects and the invention itself, will be better understood by reference to the following description of an embodiment thereof taken in connection with the accompanying drawing in which the single figure shows a circuit diagram of one embodiment of the invention.

In said figure, an oscillator 1 having a normal or central frequency $f$ osc. is indicated. In practice it will include a means for maintaining its frequency substantially constant as against any tendency to deviate, said means being subject to a suitable control voltage such, for example, as that provided by an embodiment of this invention. The input of this oscillator is fed to a discriminator arrangement, which in itself is known and may consist of an off-tuned resonant circuit 2. The wave energy passed by the resonant circuit is rectified in the diode rectifier circuit 3. The magnitude of the voltage so rectified is a function then of the extent of deviation of the oscillator frequency from normal and is utilized in generating a control voltage as will be presently described.

At 4 is indicated any suitable type of standard, or stable, wave source having frequency $fs$. The wave from this standard frequency source, after passing through electron discharge tube 5, constitutes a further element utilized in generating the aforesaid control voltage.

In side the dot-dash inclosure 6, there are shown the elements constituting a delay transmission line. This line comprises series inductance sections 7. The shunt reactance elements are constituted by so-called reactance electron tubes 8, each being a triode and there being one for each line section, as shown. The control electrodes of the reactance tubes are coupled in parallel to the output of said rectifier 3. It will be understood however, that the structure of this line may vary considerably and that other types of tube than triode may be used. The delay line is connected in a series loop with an amplifier 9. This amplifier consists of one or more amplifying units, such as electron tubes, in a cascade. The particular circuit of this amplifier which, in itself is known, is not shown in detail since it is not material. The essential requirement according to the preferred embodiment of the invention is that the net gain around the entire loop including the delay line be adjusted for 1:1. The above mentioned standard frequency source is connected by way of lead 10 to the input of this reiterative amplifier which in turn transmits pulsed energy of this standard frequency to the end of the delay line to which the output of the amplifier is connected, this energy is delayed, or phase shifted, by the delay line and then recycled about the loop. The amount of phase shift accumulates with the successive cyclings. Standard frequency wave energy with its phase shift thus materially accumulated is applied over a lead 11 to a mixer circuit 12, to which circuit there is also applied over lead 13 energy from the oscillator source to be controlled. The beat energy of these two input waves is translated in known manner to provide a voltage for controlling the frequency of said oscillator 1.

For controlling the supply of standard frequency energy to the reiterative amplifier and for controlling the mixer, there is provided a pulse generator 14 which can be of any suitable type. It produces pulse 15 of a predetermined repetition frequency for controlling said electron tube 5 in order to key the standard frequency transmitted to the reinterative amplifier, and it produces also a synchronized pulse 16 for controlling the mixer. Pulse 15 is arranged to actuate mixer 12 when tube 5 is blocked and vice versa. Thus only the cycled standard frequency energy is applied to the mixer. It will be seen from the foregoing that the number of cycling times is dependent on the keying pulse duration and its repetition frequency.

The arrangement thus described operates in the following manner. By giving the bias on the reactance tubes a predetermined value, a definite total delay at center frequency is obtained which is an integral number of wave-lengths of the standard, or stable, wave. Therefore at center frequency no beat frequency output will result from mixing the standard frequency waves and the standard waves after reiterative passes thru amplifier 9. If now the oscillator frequency deviates from center in either direction, the control of the delay characteristic of the delay line correspondingly varies in the respective direction and likewise the total augmented delay or phase shift so that now a difference exists between the waves to be compared in mixer 12.

This phase shifted energy passes over conductor 10 to the mixer. Since the mixer is synchronously controlled by the keying pulse to enable it to receive this energy along with that from the oscillation output, it produces under proper regulation a resultant output indicative of that frequency control over the oscillator necessary to overcome the deviation.

It will be seen that the total delay change corresponding to a small deviation can be made very large and hence the frequency control becomes extremely accurate.

As shown in the embodiment described, the mixer is connected to make comparison between the greatly multiplied phase change of the stable frequency source and the instantaneous oscillator frequency. It is pointed out that this multiplied phase change in the stable frequency source is a function of both the oscillator deviation and the multiplication of its own phase change, and accordingly, a comparison between said stable frequency source before and after its frequency has thus been augmented should produce a resultant carrying the deviation change, and it is to be understood that such modification is included within the scope of this invention.

It is further obvious that many variations in the forms of the elemental components of the invention and in the circuit and structural details thereof are possible without departing from the spirit of the invention, and all such are understood to be included within the scope of the claimed invention.

What is claimed is:

1. An automatic frequency control arrangement comprising a first source of oscillations, an oscillation source of standard frequency, a delay line, means coupled to said standard frequency source and said delay line for applying oscillations from said source of standard frequency to said delay line in pulsed form, means coupled to the input and output of said line for recycling pulses of oscillations through said line to produce a phase shifting of said pulsed oscillations that increases with each recycling, frequency discriminating means coupled to the output of said first source for producing an output voltage proportional to the deviation of the frequency of said oscillations over a given frequency, means responsive to said output voltage to vary the delay of said line, and means coupled to said first source and said recycling means for comparing the phase of the oscillations from the standard frequency source with the phase of the recycled pulsed standard frequency oscillations to provide a voltage for controlling the frequency of said first source.

2. An automatic frequency control arrangement according to claim 1 wherein said means for applying oscillations comprises a normally blocked amplifier, a pulse generator, means for applying the pulses from said generator to said amplifier to periodically unblock it, means for coupling said oscillation source of standard frequency to the input of said amplifier and means for coupling the output of said amplifier to said recycling means.

3. An automatic frequency control arrangement according to claim 1 wherein said means to vary the delay of said line comprises a plurality of reactance tubes associated with said delay line and connections for applying said output voltage to said reactance tubes.

4. An automatic frequency control arrangement according to claim 1 wherein said recycling means comprises a reiterative amplifier coupled to receive energy from the standard frequency source and to recycle it through the delay line.

5. An automatic frequency control arrangement according to claim 4 wherein said reiterative amplifier is adjusted for unity gain around the entire circuit including said delay line.

6. An automatic frequency control arrangement according to claim 1 wherein said comparing means comprises a mixer device coupled to said first source and connected to receive the recycled pulsed standard frequency oscillations, and means for keying the mixer device.

7. An automatic frequency control arrangement according to claim 6 wherein said means for keying the mixer device comprises a pulse generator coupled thereto and said means for applying oscillations from said source of standard frequency to said recycling means in pulsed form comprises a normally blocked amplifier, connections for applying pulses from said pulse generator to periodically unblock said amplifier and means for coupling the standard frequency source to said amplifier.

ROBERT S. BAILEY.

REFERENCES CITED

The following references are of record in the file of this patent:

UNITED STATES PATENTS

| Number | Name | Date |
|---|---|---|
| 2,048,079 | Labin et al. | Sept. 24, 1946 |